Jan. 27, 1953     L. SLOAN     2,626,692
CLUTCH

Filed March 18, 1950     2 SHEETS—SHEET 1

INVENTOR.
LON SLOAN
BY James B. Christie
ATTORNEY

Jan. 27, 1953 L. SLOAN 2,626,692
CLUTCH
Filed March 18, 1950 2 SHEETS—SHEET 2

INVENTOR.
LON SLOAN
BY
James B. Christie
ATTORNEY

Patented Jan. 27, 1953

2,626,692

UNITED STATES PATENT OFFICE 2,626,692

CLUTCH

Lon Sloan, South Pasadena, Calif.

Application March 18, 1950, Serial No. 150,406

8 Claims. (Cl. 192—93)

This invention relates to improvements in clutches and more particularly to a self-energizing clutch of the plate type.

The clutch of the invention finds use in any application wherein conventional plate or multiple disk clutches are presently employed or specified. The clutch has the same or greater rating than a multiple disk clutch of the same size, the maximum rating being accomplished with considerably less shifting pressure (pressure at the shifting sleeve) than is required in a multiple disk clutch. At the same time the rating of the present clutch exceeds the rating of a conventional plate clutch of equal diameter.

The rating advantage of my clutch is due to a self-energizing feature which imparts an extremely high rating comparable to that of a multiple disk clutch having many times the effective friction surface of the present clutch. Thus the shifting pressure required in the clutch of the invention, that is, the required thrust on the shifting sleeve is considerably less to achieve maximum rating in a given size clutch than the shifting pressure required in a multiple disk clutch of the same rating or in an equivalent conventional plate clutch.

An important feature of the invention, therefore, is the compactness of the clutch for a given rating and the comparatively small shifting thrust required. Moreover, the clutch is economical to build for the reason that all levers and toggles found in many conventional clutches have been eliminated.

In one aspect, therefore, the invention contemplates a clutch comprising a body, a friction plate rotatably mounted on the body, power take-off means connected to the friction plate, an annular pressure plate axially slidable on the body and adapted to clamp the friction plate against a cup rigidly mounted on an end of the body when axial pressure is exerted on the pressure plate, a plurality of spherical balls encased within the body and bearing against the pressure plate, a shifter sleeve axially slidable on the body, and wedge means connected to the shifter sleeve for wedging the balls against the friction plate to provide the axial thrust for clamping the friction plate between the pressure plate and the body.

The clutch is self-energizing, that is, once the wedging action between the several balls and the pressure plate has been initiated by axial shift of the shifting sleeve the thrust exerted by the balls against the pressure plate increases without additional application of external force to a predetermined maximum to give maximum rating with only a minimum of initial thrust. Thus the only axial thrust required on the shifting sleeve is that required to overcome its inertia and the inertia and friction of the moving parts connected thereto, and once this thrust has been applied, additional pressure necessary to engage the clutch is inherently produced within the clutch itself.

The invention will be more clearly understood from the following detailed description thereof taken in conjunction with the accompanying drawing wherein.

Figure 1:
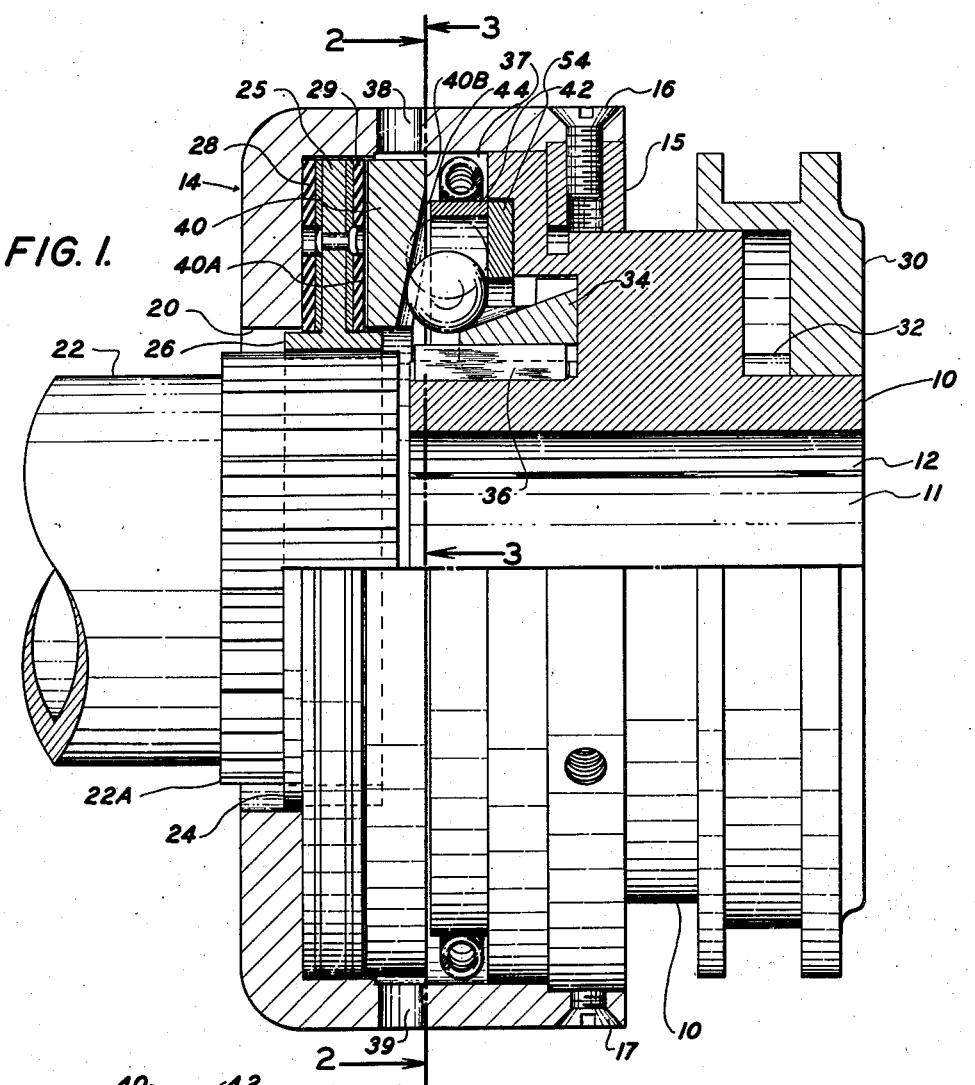
Fig. 1 is a longitudinal elevation, partly in section, of the clutch of the invention.
Figure 4:
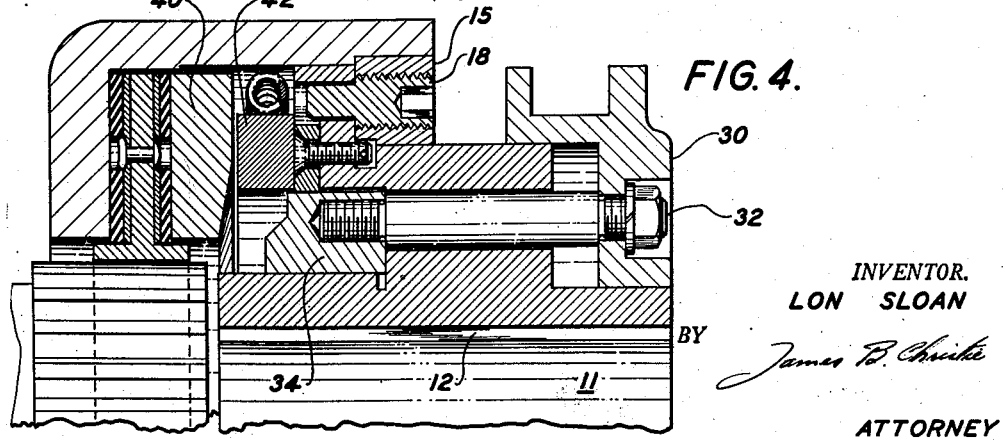
Fig. 4 is a longitudinal sectional elevation taken on the line 4—4 of Fig. 2 showing a section through the clutch on a different diameter than the section of Fig. 1.

Referring to all of the drawings, the clutch comprises a body 10 having an axial bore 11 in which a drive member (not shown) may be keyed in a key way 12. The body member 10 includes an end cup 14 which has an annular adjusting ring 15 affixed to the inner open end of the cup by set screws 16, 17, etc. The adjusting ring provides means for fastening the cup 14 by screws 18, etc. to the body. The screws 18 serve the double function of registering the cup with the body and furnishing means for adjusting the clamping action. Thus the cup 14 is rigidly affixed to the body 10 rotating therewith and to all intents and purposes forms an integral part of the body. The outer end or bottom of the cup is provided with a central bore 20 coaxial with the bore 11 of the body 10. A power take-off member 22 is journaled through the bore 20 and is splined to a friction plate assembly 24 rotatable within the confines of cup 14. The friction plate 24 comprises an annular central plate 25 having a hub 26 which is toothed on its inner circumference to form a gear engaging a gear 22A on the end of member 22. Annular friction facing plates 28, 29 are riveted to either face of the center plate 25 forming the friction surfaces by means of which the rotation of the driven member (not shown) is transmitted through the clutch body and friction plate to the member 22.

A shifter sleeve 30 is slidably mounted on the body 10 and is firmly affixed by a plurality of studs 32, extending from the shifter sleeve through the body, to an annular thrust ring 34 mounted coaxially on the body and slidable thereon. The ring 34 is connected to the body by the aforementioned studs 32 and by a key 36. Thus the ring 34 is longitudinally slidable on the body and rotates with the body. An annular chamber 37 is defined by the body 10 and cup 14 which is vented through a plurality of vent holes 38, 39, etc. The friction plate 24 is housed in the outer end of this annular chamber, i. e. adjacent the enclosed end of cup 14. An annular pressure plate 40 is mounted within the annular chamber 37 adjacent the inner friction facing plate 29. The pressure plate 40 has an outer face 40A transverse to its longitudinal axis and bearing against the friction facing plate 29 of the friction plate assembly 24. The opposing friction facing 28 bears against the end face of the cup 14 so that rotation of the body and cup is transmitted to the friction plate assembly upon exertion of sufficient axial thrust by the pressure plate 40. An annular ball cage ring 42 is mounted coaxially in the annular chamber 37 adjacent the pressure plate 40. The inside diameter of the ball cage 42 is slightly greater than the outside diameter of the thrust ring 34 so that the thrust ring 34 may be moved axially in the confines of the ball cage.

Figure 3:
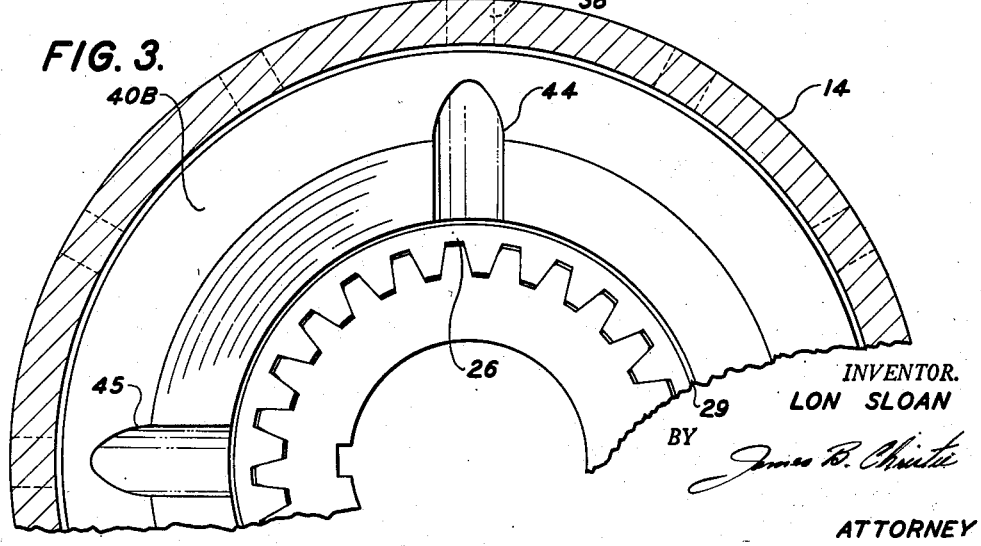
Fig. 3 is a transverse sectional elevation taken on the line 3—3 of Fig. 1.

The shape of the pressure plate 40 is most clearly seen in the sectional elevation of Fig. 1 and the transverse section of Fig. 3 which is taken on the line 3—3 of Fig. 1. Referring to these two drawings the plate 40 is seen to have a flat face 40A which may be referred to as the outer face, transverse to the longitudinal axis of the clutch and bearing against the friction surface 29. The opposite or inner face 40B of the pressure plate is divided into two annular sections, the outer section being parallel to the outer face 40A and the inner section being beveled inwardly toward the outer face 40A. A number of concave radial grooves 44, 45, etc. are formed in the inner face 40B extending from its inner circumference through the beveled inner section and project into the outer annular section of the inner face.

Figure 2:
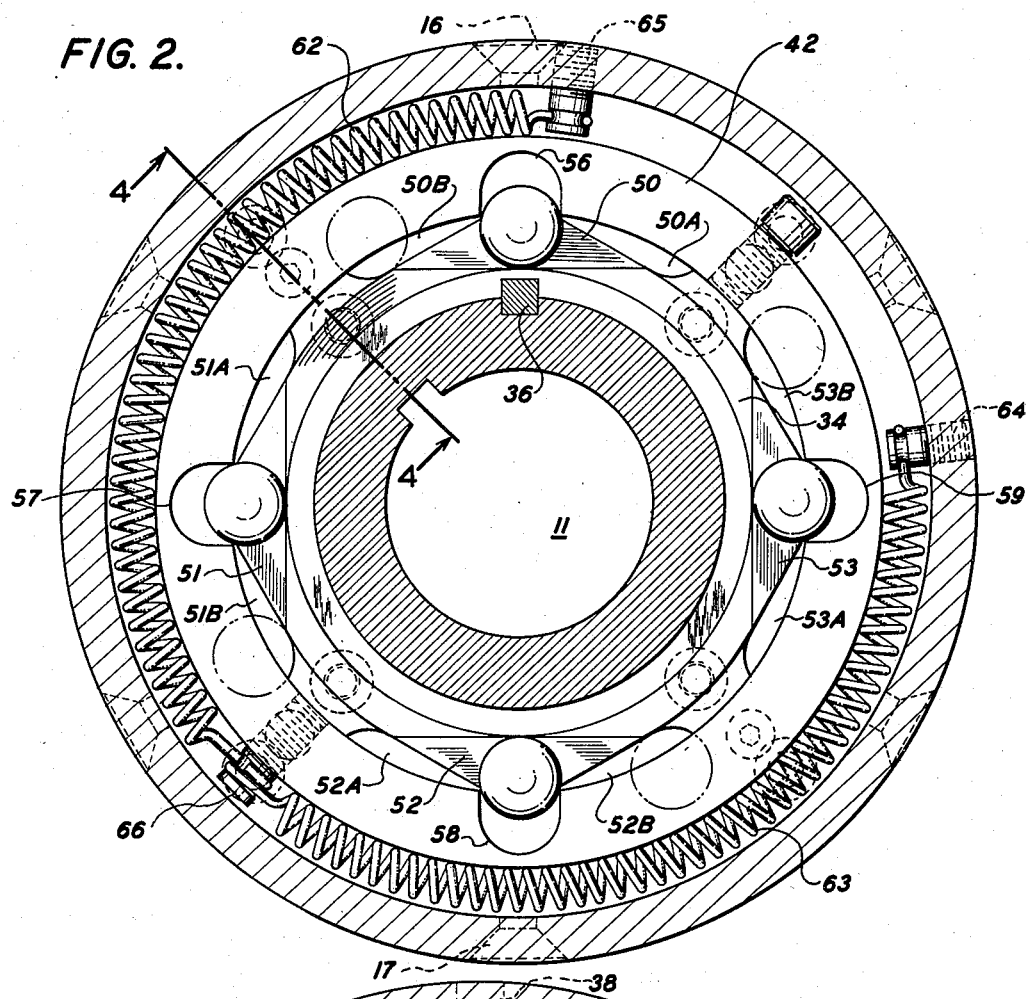
Fig. 2 is a transverse sectional elevation taken on the line 2—2 of Fig. 1.

The thrust ring 34 is of irregular configuration as is most clearly seen from sectional elevation of Fig. 1 and the transverse section of Fig. 2. At 90° intervals the outer circumference of the thrust ring 34 is beveled to form triangular ramps 50, 51, 52 and 53 with the base of the triangle being tangential to the leading edge of the ring and tapering outwardly towards the trailing edge of the ring. The outer circumference of the ring is grooved adjacent the forward edge and on either side of each of the ramps 50, 51, etc. to form the circumferential steps 50A, 50B, 51A, 51B, 52A, 52B, 53A, 53B, respectively, adjoining the opposite sides of the respective ramps. The outer end (the ends remote from the respective ramps) of each of the grooves forms a semi-circular socket for the purpose hereinafter explained.

The ball cage 42 is also best described with relation to Figs. 1 and 2. The cage comprises an annular ring having sockets 56, 57, 58 and 59 formed in the inner circumference thereof at 90° intervals. The outer circumference of the ball cage is spaced from the inner circumference of the cup 14 and a pair of helical springs 62, 63 are anchored at opposite ends to the ball cage and to the cup 14 at anchoring posts 64, 65 fastened to the cup and anchoring post 66 fastened to the cage 42. The springs 62, 63 oppose each other so that the ball cage is normally oriented with the receptacles 56, 57, etc. aligned with the center line of the several ramps 50, 51, etc. and also with the grooves 44, 45, etc. in the pressure plate 40.

The actuating assembly comprising the thrust ring 34, the pressure plate 40, and the ball cage 42 is tied together by four spherical balls which in the disengaged position of the clutch (as shown in the drawings) rest on the lower front face of the several ramps 50, 51, etc. and project into the aligned groove in the pressure plate 40 and into the aligned receptacles in the ball cage 42. The pressure plate is aligned with the ramps by means of these balls.

An annular backer ring 54 is fastened to the body around the thrust ring 34. To avoid hardening the entire body to resist wear at the point of contact of the balls therewith, the case hardened backer ring 54 is mounted to the body at this point. In addition to eliminating the necessity of fabricating the whole body out of special wear resistant metals, the backer ring has the advantage of easy replaceability. It is a simple matter to disassemble the clutch by removing cup 14 to replace any worn or defective parts including the backer ring. As an alternative the body can be locally flame hardened at this point of contact.

The operation of the clutch is as follows. With the body 10 rotating responsive to rotation of a driving shaft (not shown) keyed into bore 11, the cup 14, the thrust ring 34, the ball cage 42, the pressure plate 40 and the spherical balls themselves will all rotate as a unit with the body. However, until an axial thrust is applied to the pressure plate 40 the frictional engagement between the face 40A of the pressure plate and the frictional surface 29 and between the inner face of the cup 14 in the friction surface 28 is not such as to cause rotation of the friction plate arrangement 24 and the drive shaft 22. To engage the clutch, the shifter sleeve 30 is moved axially toward the left as viewed in Fig. 1 which urges the thrust ring 34 to the left as viewed in Fig. 1 raising the several balls on the respective inclined ramps whereby they are wedged between the pressure plate 40 and the backer ring 54. This initial wedging action is induced by a comparatively small amount of thrust applied to the shifter sleeve. An increase in friction between the pressure plate and friction plate produces a countertorque in the pressure plate, causing it to lag behind the thrust ring. As the pressure plate lags the thrust ring, the several balls are displaced laterally on their respective ramps by reason of the fact that they are trapped in the radial grooves in the pressure plate. This lateral movement of the balls on the ramps forces them outwardly and thus inducing an increased axial thrust on the pressure plate. As this thrust increases, the countertorque increases tending to displace the balls even further about the circumference of the thrust ring forcing them radially away from the axis of the clutch until each ball climbs its respective ramp and is carried by the pressure plate into one of the steps adjoining that ramp. In which of the steps the ball will seat depends of course upon the direction of rotation of the clutch. Once this progressive action is initiated by initial thrust on the shifting sleeve it is self-energizing and any continued movement of the shifting sleeve serves only as a follow up.

To disengage the clutch, the shifter sleeve is shifted back towards its disengaged position as shown in Fig. 1 and the reverse procedure takes place under the urging of springs 62, 63 which operate to exert a restoring torque on the ball cage 42 to reorient the ball cage, pressure plate and thrust ring. Thus in the process of engaging, the ball cage and pressure plate rotate to an out of phase position with respect to the thrust ring. In this position, the sockets in the ball cage and the radial grooves in the pressure plate are aligned radially with the grooved seats adjacent the ramps in the thrust ring. The springs 62 and 63 are distorted and as soon as the thrust ring is retracted, relieving to a certain extent the pressure on the pressure plate, the springs act to reorient the ball cage with the thrust ring. In so doing, the pressure plate is also reoriented and the balls are carried out of the circumferential seats on to the ramps. The thrust ring is withdrawn to the position shown in Fig. 1 at which point the clutch is disengaged.

I claim:

1. A clutch comprising a body adapted to be rotated by driving means, a friction plate housed within the body in rotatable relationship and adapted to be connected to power take-off means, an annular pressure plate mounted concentrically around the body and having a flat face engaging the friction plate, the opposite face of the pressure plate being beveled inwardly and having a plurality of symmetrically spaced concave substantially radial grooves, an annular thrust ring mounted around the body and having a plurality of inclined ramps formed on its outer circumference inclining from the leading edge of the ring away from the longitudinal axis of the body, and a separate concave channel extending circumferentially from each side of each ramp, an annular ball cage mounted concentrically adjacent the pressure plate and having a plurality of pockets therein, the pressure plate, thrust ring and ball cage being so oriented when the clutch is disengaged that each groove in the pressure plate is aligned with a ramp on the thrust ring and a pocket in the cage, a separate spherical ball resting on each of said ramps and projecting into an aligned radial groove in the pressure plate and into an aligned pocket in the ball cage, and a shifter sleeve axially slidable on said body and connected to said thrust ring so that displacement of the sleeve will result in like displacement of the ring.

2. Apparatus according to claim 1 wherein the friction plate comprises an annular disk having a central hub, and a separate annular friction facing affixed to opposite faces of the annular disk.

3. A clutch comprising a body adapted to be rotated by driving means, a friction plate housed within the body in rotatable relationship and adapted to be connected to power take-off means, an annular pressure plate mounted concentrically around the body and having a flat face engaging the friction plate, the opposite face of the pressure plate being beveled inwardly adjacent its inner circumference and having a plurality of symmetrically spaced concave substantially radial grooves extending through the beveled portion from the inner circumference, an annular thrust ring mounted around the body and having a plurality of inclined ramps formed on its outer circumference inclining from the leading edge of the ring outwardly from the longitudinal axis of the body, and a separate concave channel extending circumferentially from each side of each ramp, an annular ball cage mounted concentrically adjacent the pressure plate and having a plurality of pockets therein, the pressure plate, thrust ring and ball cage being so oriented when the clutch is disengaged that each groove in the pressure plate is aligned with a ramp on the thrust ring and a pocket in the cage, a separate spherical ball resting on each of said ramps and projecting into an aligned radial groove in the pressure plate and an aligned pocket in the ball cage, and a shifter sleeve axially slidable on said body and connected to said thrust ring so that displacement of the sleeve will result in like displacement of the ring.

4. A clutch comprising a body adapted to be rotated by driving means, a friction plate housed within the body in rotatable relationship and adapted to be connected to power take-off means, an annular pressure plate mounted concentrically around the body and having a flat face engaging the friction plate, a plurality of symmetrically spaced substantially radial grooves formed in the opposite face of the pressure plate, an annular thrust ring mounted around the body and having a plurality of inclined ramps formed on its outer circumference inclining from the forward edge of the ring outwardly from the longitudinal axis of the body, and a separate circumferential groove extending from each side of each ramp, an annular ball cage mounted concentrically adjacent the pressure plate and having a plurality of pockets therein, the pressure plate, thrust ring and ball cage being so oriented when the clutch is disengaged that each groove in the pressure plate is aligned with a ramp on the thrust ring and a pocket in the cage, a separate spherical ball resting on each of said ramps and projecting into an aligned radial groove in the pressure plate and an aligned pocket in the ball cage, and a shifter sleeve axially slidable on said body and connected to said thrust ring so that displacement of the sleeve will result in like displacement of the ring.

5. Apparatus according to claim 4 wherein the shifter sleeve is connected to the thrust ring by a plurality of pins extending through longitudinal holes in a radially projecting portion of the body so that rotation of the body is transmitted to the shifter sleeve and thrust ring.

6. A clutch comprising a body adapted to be rotated by driving means, a friction plate housed within the body in rotatable relationship and adapted to be connected to power take-off means, an annular pressure plate mounted concentrically around the body and having a flat face engaging the friction plate, the opposite face of the pressure plate being beveled inwardly adjacent the inner circumference and having a plurality of symmetrically spaced concave substantially radial grooves, an annular thrust ring mounted around the body and having a plurality of inclined ramps formed on its outer circumference inclining from the forward edge of the ring away from the longitudinal axis of the body, and a separate concave groove extending circumferentially from each side of each ramp, an annular ball cage disposed concentrically adjacent the pressure plate and having a plurality of pockets therein, the ball cage being spring loaded with respect to the body, the pressure plate, thrust ring and ball cage being so oriented when the clutch is disengaged that each groove in the pressure plate is aligned with a ramp on the thrust ring and a pocket in the cage, a separate spherical ball resting on each of said ramps and projecting into an aligned radial groove in the pressure plate and an aligned pocket in the ball cage, and a shifter sleeve axially slidable on said body and connected to said thrust ring so that displacement of the sleeve will result in like displacement of the ring.

7. A clutch comprising a body adapted to be rotated by driving means, and including a cup member enclosing an annular chamber, a friction plate rotatable in the annular chamber and adapted to be connected to power take-off means journalled through an end of said cup member, an annular pressure plate mounted concentrically around the body and having a flat face engaging the friction plate and adapted to bind the friction plate against the end of the cup member, the opposite face of the pressure plate being beveled inwardly adjacent the inner circumference and having a plurality of symmetrically spaced substantially radial grooves, an annular thrust ring mounted around the body and having a plurality of inclined ramps formed on its outer circumference inclining from the leading edge of the ring outwardly from the longitudinal axis of the body, and a separate groove extending circumferentially from each side of each ramp, an annular ball cage mounted concentrically around the body adjacent the pressure plate and having a plurality of pockets therein, the pressure plate, thrust ring and ball cage being so oriented when the clutch is disengaged that each groove in pressure plate is aligned with a ramp on the thrust ring and a pocket in the cage, a separate spherical ball resting on each of said ramps and projecting into an aligned radial groove in the pressure plate and an aligned pocket in the ball cage and bearing against the body opposite said radial groove, and a shifter sleeve axially slidable on said body and connected to said thrust ring so that displacement of the sleeve will result in like displacement of the ring.

8. Apparatus according to claim 7 wherein an annular wear resistant ring is fastened to the body at the point of contact of the spherical balls.

LON SLOAN.

REFERENCES CITED

The following references are of record in the file of this patent:

UNITED STATES PATENTS

| Number | Name | Date |
|---|---|---|
| 1,434,970 | Taylor | Nov. 7, 1922 |
| 1,623,236 | De Roo | Apr. 25, 1927 |
| 2,138,129 | Wolfrom | Nov. 29, 1938 |
| 2,244,169 | Miller | June 3, 1941 |
| 2,262,708 | Lambert | Nov. 11, 1941 |
| 2,376,799 | Miller | May 22, 1945 |
| 2,506,713 | Fast | May 9, 1950 |

FOREIGN PATENTS

| Number | Country | Date |
|---|---|---|
| 145,695 | Great Britain | Nov. 30, 1921 |
| 146,866 | Great Britain | July 7, 1921 |